United States Patent
Mzyk et al.

(10) Patent No.: US 12,143,975 B2
(45) Date of Patent: Nov. 12, 2024

(54) METHOD FOR THE BIDIRECTIONAL TRANSMISSION OF DATA, IN PARTICULAR SENSOR DATA, AND RADIO-CAPABLE NODE

(71) Applicant: Diehl Metering Systems GmbH, Nuremberg (DE)

(72) Inventors: Raphael Mzyk, Kammerstein (DE); Hristo Petkov, Nuremberg (DE); Thomas Lautenbacher, Erlangen (DE); Thomas Kauppert, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 405 days.

(21) Appl. No.: 17/669,413

(22) Filed: Feb. 11, 2022

(65) Prior Publication Data

US 2022/0167354 A1  May 26, 2022

Related U.S. Application Data

(63) Continuation of application No. PCT/EP2020/071797, filed on Aug. 3, 2020.

(30) Foreign Application Priority Data

Aug. 13, 2019 (DE) ...................... 10 2019 005 681.7

(51) Int. Cl.
*H04W 72/0453* (2023.01)
(52) U.S. Cl.
CPC ............................... *H04W 72/0453* (2013.01)
(58) Field of Classification Search
CPC ...... G04G 7/02; H04W 56/00; H04W 56/001; H04W 72/0453
See application file for complete search history.

(56) References Cited

U.S. PATENT DOCUMENTS 8,234,109 B2 * 7/2012 Zhan ................... H04L 12/6418
704/203
9,184,832 B2  11/2015 Kilian et al.
(Continued)

FOREIGN PATENT DOCUMENTS

CA     3041366 A1 *  5/2018  ........... H04B 1/7143
CA     3059621 A1 * 10/2018  ........... H04B 1/7143
(Continued)

*Primary Examiner* — Eric Nowlin
(74) *Attorney, Agent, or Firm* — Laurence A. Greenberg; Werner H. Stemer; Ralph E. Locher

(57) ABSTRACT

A method for transmitting data or sensor data by radio between a preferably fixed battery-operated node and base station in a communication system with bidirectional radio transmission, includes providing a base station communication module having a first frequency transmitter, and a node communication module having a first frequency transmitter and second frequency transmitter with lower frequency. The node communication module transmits data in the uplink to the base station communication module by splitting a radio telegram into data packets transmitted successively with temporal spacing. The base station communication module transmits data in the downlink to the node communication module by splitting a radio telegram into data packets transmitted successively with temporal spacing. To improve downlink reception quality, two calibrations of first and second node frequency transmitters occur during transmission of the sum of a sequence of uplink data packets and subsequent sequence of downlink data packets including periods therebetween.

20 Claims, 7 Drawing Sheets

(56) References Cited

U.S. PATENT DOCUMENTS

| | | | |
|---|---|---|---|
| 9,354,081 B2 * | 5/2016 | Bernhard | G01D 4/002 |
| 10,039,084 B2 * | 7/2018 | Bernhard | G01D 4/002 |
| 10,433,325 B2 * | 10/2019 | Muench | H04W 8/04 |
| 10,805,142 B2 | 10/2020 | Petkov et al. | |
| 10,820,070 B2 | 10/2020 | Petkov et al. | |
| 10,826,675 B2 | 11/2020 | Mzyk et al. | |
| 11,064,439 B2 * | 7/2021 | Yerramalli | H04L 1/001 |
| 11,067,684 B2 * | 7/2021 | Kilian | G01S 11/08 |
| 11,070,247 B2 * | 7/2021 | Kilian | H04L 1/0061 |
| 11,095,702 B2 * | 8/2021 | Papalini | H04L 69/162 |
| 11,368,186 B2 * | 6/2022 | Kilian | H04B 1/7143 |
| 2005/0075125 A1 | 4/2005 | Bada et al. | |
| 2009/0201152 A1 | 8/2009 | Karr et al. | |
| 2010/0075611 A1 | 3/2010 | Budampati et al. | |
| 2010/0228542 A1 * | 9/2010 | Zhan | G10L 19/005 704/203 |
| 2014/0176341 A1 * | 6/2014 | Bernhard | H04W 52/0209 340/870.02 |
| 2016/0164745 A1 | 6/2016 | Quigley et al. | |
| 2018/0070373 A1 * | 3/2018 | Muench | H04W 56/001 |
| 2019/0036834 A1 | 1/2019 | Bernhard et al. | |
| 2019/0082412 A1 * | 3/2019 | Zander | H04W 56/0035 |
| 2019/0110254 A1 * | 4/2019 | Yerramalli | H04L 27/2646 |
| 2019/0227158 A1 * | 7/2019 | Kilian | H04W 64/00 |
| 2019/0253102 A1 * | 8/2019 | Kilian | H04L 1/0061 |
| 2020/0052736 A1 * | 2/2020 | Kilian | H04L 5/0044 |
| 2021/0112485 A1 * | 4/2021 | Obernosterer | H04W 72/51 |
| 2021/0385768 A1 * | 12/2021 | Kilian | H04B 1/7073 |
| 2022/0167354 A1 * | 5/2022 | Mzyk | H04W 72/0453 |

FOREIGN PATENT DOCUMENTS

| | | | | |
|---|---|---|---|---|
| CA | 3059621 C | * | 3/2023 | H04B 1/7143 |
| CA | 3104217 C | * | 6/2023 | H04B 1/7143 |
| CN | 113785631 A | * | 12/2021 | H04B 1/692 |
| CN | 109314599 B | * | 6/2022 | H04L 1/0007 |
| CN | 110036591 B | * | 9/2022 | H04B 1/7143 |
| DE | 102005020349 B4 | | 5/2007 | |
| DE | 102010031411 A1 | | 1/2012 | |
| DE | 102011082098 A1 | * | 3/2013 | G01D 4/002 |
| DE | 102016009197 B3 | | 7/2017 | |
| DE | 102016205052 A1 | | 9/2017 | |
| DE | 102016220882 A1 | * | 4/2018 | H04B 1/7143 |
| DE | 102018004828 A1 | | 3/2019 | |
| DE | 102018004815 A1 | | 12/2019 | |
| DE | 102018210243 A1 | * | 12/2019 | H04B 1/7143 |
| DE | 102019202756 A1 | * | 9/2020 | H04B 1/692 |
| EP | 1791100 A1 | | 5/2007 | |
| EP | 2751526 B1 | | 11/2015 | |
| EP | 3529938 B1 | * | 11/2020 | H04B 1/7143 |
| EP | 3433960 B1 | * | 5/2022 | H04L 1/0007 |
| EP | 3811704 B1 | * | 8/2022 | H04B 1/7143 |
| EP | 3684114 B1 | * | 11/2023 | H04L 5/0078 |
| KR | 20190082797 A | * | 7/2019 | |
| RU | 2749846 C2 | * | 6/2021 | H04B 1/7143 |
| WO | WO-2013030303 A2 | * | 3/2013 | G01D 4/002 |
| WO | WO-2018059782 A9 | * | 5/2018 | G01S 11/08 |
| WO | WO-2018077770 A2 | * | 5/2018 | H04B 1/7143 |
| WO | WO-2018059782 A1 | * | 3/2019 | G01S 11/08 |
| WO | WO-2021028247 A1 | * | 2/2021 | G04G 7/02 |

* cited by examiner

METHOD FOR THE BIDIRECTIONAL TRANSMISSION OF DATA, IN PARTICULAR SENSOR DATA, AND RADIO-CAPABLE NODE

CROSS-REFERENCE TO RELATED APPLICATION

This application is a continuation, under 35 U.S.C. § 120, of copending International Patent Application PCT/EP2020/071797, filed Aug. 3, 2020, which designated the United States; this application also claims the priority, under 35 U.S.C. § 119, of German Patent Application DE 10 2019 005 681.7, filed Aug. 13, 2019; the prior applications are herewith incorporated by reference in their entirety.

FIELD AND BACKGROUND OF THE INVENTION

The present invention relates to a method for transmitting data, in particular sensor data, by radio between at least one battery-operated node, which is preferably permanently installed at a fixed location, and a base station in a communication system using bidirectional radio transmission operation. The present invention also relates to a radio-capable node that can be operated using the aforementioned method.

Nodes of a communication system such as e.g. smart consumption meters are normally associated with local positions such as e.g. respective residential units or residential buildings. The measurement data obtained there can be read in a wide variety of ways. Measurement data can e.g. be read by way of the electricity grid (power line). Incorporation of the consumption meters into a regional network is not possible in that case, however. Furthermore, measurement data can be transmitted in the form of data packets or telegrams by using mobile radio technology. However, that is expensive, presupposes the installation of mobile radio modules at the consumption meters and has disadvantages regarding the high power consumption at the individual consumption meters. Furthermore, measurement data in the form of data packets or telegrams can also be transmitted by radio, for example in the ISM (industrial, scientific, medical) band frequency range or in the SRD (short range devices) band frequency range. Those frequency bands have the advantage that the operators require only a general license for frequency management. However, there is the problem that the regularity with which such frequency bands are used for a wide variety of technical devices such as for example garage door controllers, baby monitors, alarm systems, WLAN, Bluetooth, smoke alarms, etc., means that interference can frequently arise. Collection of the measurement data by radio is effected either by fixed or mobile data collectors (base stations or collectors), to which the measurement data provided in the transmitters of the consumption meters are transmitted.

That involves consumption meters transmitting measurement data to a data collector in specific, very short set periods (set time, or set instant, including time deviation) and the measurement data received in those set periods being used for evaluating a consumption. A particular challenge in that case is that a communication between the data collector and consumption meters requires very exact time synchronization between the oscillators located in the region of the consumption meters and those of the data collector. The frequency generators used for oscillators of autonomous consumption meters (with a time recording function of a frequency reference device) are simple crystals having relatively low frequency and accordingly low power consumption. Production tolerances, temperature behaviors and ageing mean that such crystals have crystal errors of approximately 10-100 ppm. In a standard crystal, for example, a crystal error of 50 ppm results in a deviation of 4.3 seconds per day or 26 minutes per annum. That in turn already results in a deviation in the time synchronization in the event of small temperature variations, which become noticeable even for very short periods. The result is poor reception.

A bidirectional transmission involves an uplink transmission from the nodes to the base station being followed by a narrowband downlink transmission of data from the base station to the respective nodes. The data transmitted in the downlink are for example an acknowledgement of reception of a data packet or telegram by the base station, a request for whether for example further data are also transmitted from the respective node to the base station, control telegrams or other data/information to be transmitted to the respective node. Both in the uplink and in the downlink, the transmission of the data by telegram does not take place in one piece. Instead, the telegram is split into individual data packets having a shorter length compared to the telegram, the data packets then being successively transmitted individually at intervals of time from one another and decoded, or recombined, in the receiver. The particular problem that exists for the downlink in that case is that the number of data packets is greater than for the uplink and the time for transmitting the individual data packets therefore takes longer. Furthermore, the carrier frequency for the data packets must correspond very exactly to the carrier frequency expected by the node in order for the influence of noise to be rejected as far as possible. Finally, the node must open its reception window for the downlink at the expected time, which is an additional difficulty, however, due to the temperature-related divergence (offset) of the frequency of the node's frequency generator. Accordingly, the temperature and the advancing time to reception of the last data packet of a telegram in the downlink can cause a frequency misalignment and/or a time misalignment to occur that hampers or even prevents good reception of the data packets in the downlink.

DESCRIPTION OF THE RELATED ART

A method for transmitting data is known from German Patent DE 10 2005 020 349 B4. In the consumption recording system described therein, the consumption meters have a first clock generator (clock) with lower power consumption for continuous operation and a second clock generator with higher frequency stability and higher power consumption, which is operated only in short activation phases. According to the concept described therein, the frequency, the period duration or a variable derived therefrom is recorded in the consumption meter during the short activation phases of the second clock generator as a clock measure of the first clock generator on the basis of a consumption scale derived from the second clock generator, and the accumulated time of the first clock generator is corrected on the basis of the determined deviation. The result of that is that the timing error then corresponds to the timing error of the second clock generator of the consumption meter.

German Application DE 10 2010 031 411 A1, corresponding to U.S. Pat. No. 9,184,832 and European Patent EP 2 751 526 B1, corresponding to U.S. Pat. Nos. 9,354,081 and 10,039,084, describe a configuration for the wireless transmission of payload data that involves the payload data being split into a plurality of channel-coded data packets and transmitted from a node to a base station over a wireless communication channel within a time interval. In the base station, the data packets are decoded and recombined to produce the payload data. According to European Patent EP 2 751 526 B1, corresponding to U.S. Pat. Nos. 9,354,081 and 10,039,084, the node for generating data packets may be configured to split a synchronization sequence into partial synchronization sequences and to provide each data packet with one of the partial synchronization sequences. Synchronization sequences are deterministic or pseudorandom binary data strings that are transmitted to the base station together with the actual payload data or sensor data in the data packets. The base station knows the synchronization sequences. By correlating the received data stream with the known synchronization sequence, the base station can ascertain the temporal position of the known synchronization sequence in the received data stream. In order to keep the data packets short, the synchronization sequence can be distributed over the individual short data packets in that case, with the result that the individual data packet has worse synchronization properties than the synchronization over multiple data packets.

In German Application DE 10 2016 205 052 A1, corresponding to U.S. Publication No. 2019/0036834, to improve the channel utilization level, a data transmitter is proposed that is configured to use an additional transmission data packet, which is sent in a gap or break between two transmission data packets, to predefine for another data transmitter a transmission time at which the other data transmitter transmits a transmission data packet, or an interval of time between two transmission data packets transmitted by the other data transmitter.

According to German Patent DE 10 2016 009 197 B3, corresponding to U.S. Pat. No. 10,805,142, for the purpose of transmitting telegrams from a data collector to a meter, the transmitter's reference frequency is shifted in the data collector by the frequency difference between the data collector's reference frequency and a meter reference frequency following receipt of a data telegram from the meter.

German Application DE 10 2018 004 828 A1, corresponding to U.S. Pat. No. 10,820,070, describes a method for transmitting data between a terminal and a data collector by radio that involves, following setup of the communication, the terminal transmitting a message to the data collector and the data collector, after receiving the message, continuing, interrupting or terminating the transmission of the data on the basis of the content of the message during the communication.

SUMMARY OF THE INVENTION

It is accordingly an object of the invention to provide a method for the bidirectional transmission of data, in particular sensor data, and a radio-capable node, which overcome the hereinafore-mentioned disadvantages of the heretofore-known methods and nodes of this general type and which improve the reception quality in the downlink.

With the foregoing and other objects in view there is provided, in accordance with the invention, a method for transmitting data, in particular sensor data, by radio between at least one battery-operated node, which is preferably permanently installed at a fixed location, and a base station in a communication system using bidirectional radio transmission operation, wherein the base station has a communication module having a first frequency generator, the node has a communication module having a first frequency generator and a second frequency generator with a lower frequency than that of the first frequency generator, the communication module of the node is intended to transmit data to the communication module of the base station in the uplink by splitting a radio telegram into at least two data packets, preferably into a multiplicity of data packets, which data packets are transmitted successively at intervals of time, the communication module of the base station is intended to transmit data to the communication module of the node in the downlink by splitting a radio telegram into at least two data packets, preferably into a plurality of data packets, which are transmitted successively at intervals of time, and at least two calibrations for the first frequency generator and the second frequency generator of the node take place during the transmission period for the sum total of a succession of the data packets and a subsequent succession of the data packets, including any period that might come in between.

With the objects of the invention in view, there is concomitantly provided a radio-capable node for transmitting data, in particular sensor data, by radio to a base station over a bidirectional radio transmission link, comprising a control and computing unit, a battery, a communication module, a first frequency generator, and a second frequency generator, the control and computing unit being set up and/or programmed in such a way that the node can be operated by using the method according to the invention.

Expedient configurations of the method and the node according to the invention are claimed in the dependent claims.

As a result of at least two calibrations for the lower-frequency second frequency generator by the higher-frequency first frequency generator of the node taking place during the transmission period for the sum total of a succession of the uplink data packets and a subsequent succession of the downlink data packets, including any period that might come in between, the requirements for the symbol duration can be better met for reception of the downlink data packets by the node because the comparatively more highly temperature-related offset of the lower-frequency second frequency generator of the node can no longer have such a pronounced effect on the symbol duration due to the repeated calibration. Moreover, the interval between the transmission of the data packets in the uplink and the transmission of the data packets in the downlink can be increased because the calibration according to the invention means that the error would then still be small enough. In particular, the invention can also meet the requirement according to which the symbol to be transmitted is no greater than one quarter of the symbol duration. The reason is that the receiver in the meter searches only over the range of one quarter of the symbol duration. The exact return of the data packets in the downlink means that it is moreover also possible to save electrical energy, since computer power can be saved.

It is advantageous if at least one calibration for the second frequency generator by the first frequency generator of the node takes place between reception of the last uplink data packet and reception of the first downlink data packet of the subsequent data packets of the immediately subsequent downlink telegram in the node, since in the field the period of time until then can be a few minutes, that is to say can be fairly long. A disadvantageous temperature-related frequency offset can already occur at the second frequency generator in this period of time, which can disadvantageously impair reception. In particular, the aforementioned calibration can take place shortly before reception of the first downlink data packet.

Furthermore, at least one further calibration for the second frequency generator by the first frequency generator of the node can take place over the total duration of the transmission of the downlink data packets of the relevant telegram after reception of the first downlink data packet. This allows the disadvantageous influence of the long duration of the transmission of the downlink data packets and the resultant offset influence of the second frequency generator of the node to be reduced further. Furthermore, a cognitive value can be obtained from the comparison of the calibrations, the cognitive value being able to be included in the method for receiving the downlink data packets.

In order to save the battery of the node to the greatest possible extent, expediently only the second frequency generator is constantly active during operation of the node, whereas the first frequency generator, which consumes more energy due to the higher frequency, is activated only intermittently when receiving data and when transmitting data.

The calibrations to be performed repeatedly are in each case accordingly new calibrations or recalibrations that eliminate the resultant offset since the last applicable calibration.

Furthermore, the present invention allows the deviation over time for subsequent calibrations for the first frequency generator and the second frequency generator of the node to be determined, a compensation factor to be derived from the deviation and the compensation factor to be included in a reception algorithm for searching for the data packets within a reception window. This allows particular fine adjustment in regard to more exact detection of the samples and at the same time leads to a decrease in the necessary processing power of the microprocessor, which again allows the battery to be saved.

As a result of one calibration from the at least two calibrations taking place during the transmission period for the sum total of the succession of the downlink data packets, it is even possible for the second frequency generator of the node to be readjusted again during the period of time for the transmission of a telegram in the downlink, with the result that the node can set its reception window particularly exactly compared to the transmission time of the downlink data packet from the base station. Moreover, during the relatively long period of time for the transmission of a telegram in the downlink, the node receives an offset comparison value for the last applicable calibration, which value can again be used for fine compensation or for computing the compensation factor during the time for the transmission of the downlink data packets and/or also for afterwards.

Preferably, one calibration from the set of the at least two calibrations takes place at the beginning of the transmission period for the sum total of the succession of the downlink data packets. This allows the node to compensate for the reception windows for the downlink data packets as early as at the beginning of the downlink transmission.

The response of the offset over a specific time interval can be computed in order to determine the compensation factor. The node therefore knows the offset at a specific time and can take this as a basis for making a fine adjustment in regard to more exact detection of the samples.

In particular, the compensation factor can be determined by also extrapolating the response of the offset over a specific time interval either linearly or using a polynomial function. This allows a future offset to be predetermined and compensated for.

Preferably, the compensation factor allows the search field of the reception algorithm to be moved over the time axis.

In particular, the compensation factor can be taken as a basis for, by way of example, selecting specific samples stored in the communication module from the total quantity of samples stored in the communication module, and scanning only these samples. This again allows the reception quality to be improved and the required processing power to be reduced.

The accuracy of the fine adjustment can be additionally improved by including the specific offset/temperature characteristic curves of the second frequency generator and preferably also the first frequency generator when determining, or computing, the compensation factor.

Expediently, should the base station also have two separate frequency generators (crystals), the at least two calibrations for the first frequency generator and the second frequency generator of the node involve a calibration for the second frequency generator of the base station and the first frequency generator of the base station taking place at the same time. Should one and the same crystal be provided in the base station for the frequencies of the time and the carrier frequency, this additional calibration is not required in the base station, since the frequency generator of the base station has a smaller error.

Expediently, the transmission time of at least one uplink data packet is stipulated in light of the first calibration from the at least two successive calibrations for the first frequency generator and the second frequency generator of the node. The base station therefore receives the uplink data packet with an already effected calibration for the first and second frequency generators of the node. On this basis, it can stipulate the exact transmission time for the first downlink data packet.

In addition, the second or a further subsequent calibration from the at least two calibrations for the first frequency generator and the second frequency generator of the node is expediently taken as a basis for stipulating the reception window and/or for stipulating the search period for the at least one downlink data packet.

Other features which are considered as characteristic for the invention are set forth in the appended claims.

Although the invention is illustrated and described herein as embodied in a method for the bidirectional transmission of data, in particular sensor data, and a radio-capable node, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
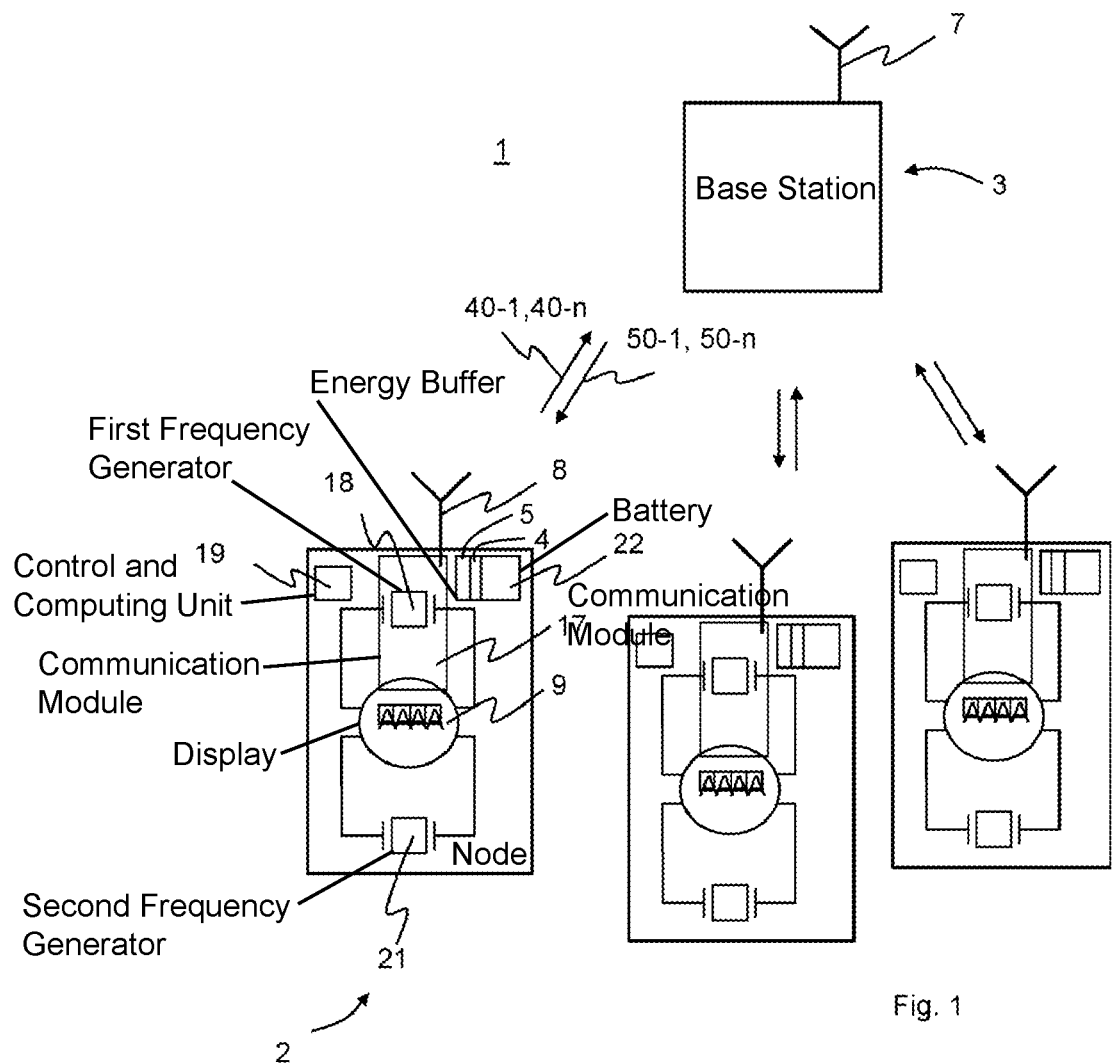
FIG. 1 is a highly simplified schematic and block diagram of an example of a bidirectional communication network with a base station and multiple related nodes.

Referring now to the figures of the drawings in detail and first, particularly, to FIG. 1 thereof, it is seen that reference numeral 1 denotes a bidirectional radio communication system, or radio communication network, that includes a base station 3, e.g. a so-called data collector, and a plurality of individual, autonomously operated nodes 2. The nodes 2 are for example sensor devices or meters of any type, for example water meters, heat meters, gas meters or electricity meters, or actuators. A common feature of these nodes 2 is that they have a communication module 17 with an antenna 8 and a control and computing unit 19. In addition, each node 2 has a first frequency generator 18 for generating a carrier frequency for the radio transmission and a second frequency generator 21 used for stipulating the times of transmission of data packets 40-1, 40-n in the uplink and for stipulating the reception windows for receiving data packets 50-1, 50-n in the downlink. The first frequency generator 18 is an HF (high-frequency) crystal, which normally has an error in the order of magnitude of 20 ppm. By contrast, the second frequency generator 21 is an LF (low-frequency) crystal, also called a time crystal, which typically has an error in the order of magnitude of 100 ppm. This corresponds to a timing error of 100 μs/s.

The second frequency generator 21 of the node 2 must always be active due to the chronometer or timer function, whereas the first generator 18 needs to be activated only in the transmission mode and/or reception mode. Otherwise, it is in a sleep mode. Each node 2 is operated with energy autonomy, i.e. has a battery 22 by way of which the individual functional units of the node 1 are supplied with energy. In this case, the communication module 17, or the control and computing unit 19, is supplied with electrical energy not directly by the battery 22 but by an energy buffer 5. The energy buffer 5 is supplied with electrical energy, i.e. charged, by way of a charging unit 4, or a charging circuit to which the battery 22 belongs.

Each node 2 may also be provided with a display 9, if desired.

The radio communication system 1 shown in FIG. 1 is operated bidirectionally. The uplink is used to transmit data packets 40-1, 40-n from the respective node 2 to the base station 3, where they are received by the antenna 7 thereof. The downlink is used to transmit data packets 50-1, 50-n from the base station 3 to each individual node 2, the data packets being received by the antenna 8 thereof.

Preferably, the SRD band or the ISM band is used for the data transmission, those bands allowing frequency bandwidths for a wide variety of applications in a license-free manner.

Figure 2:
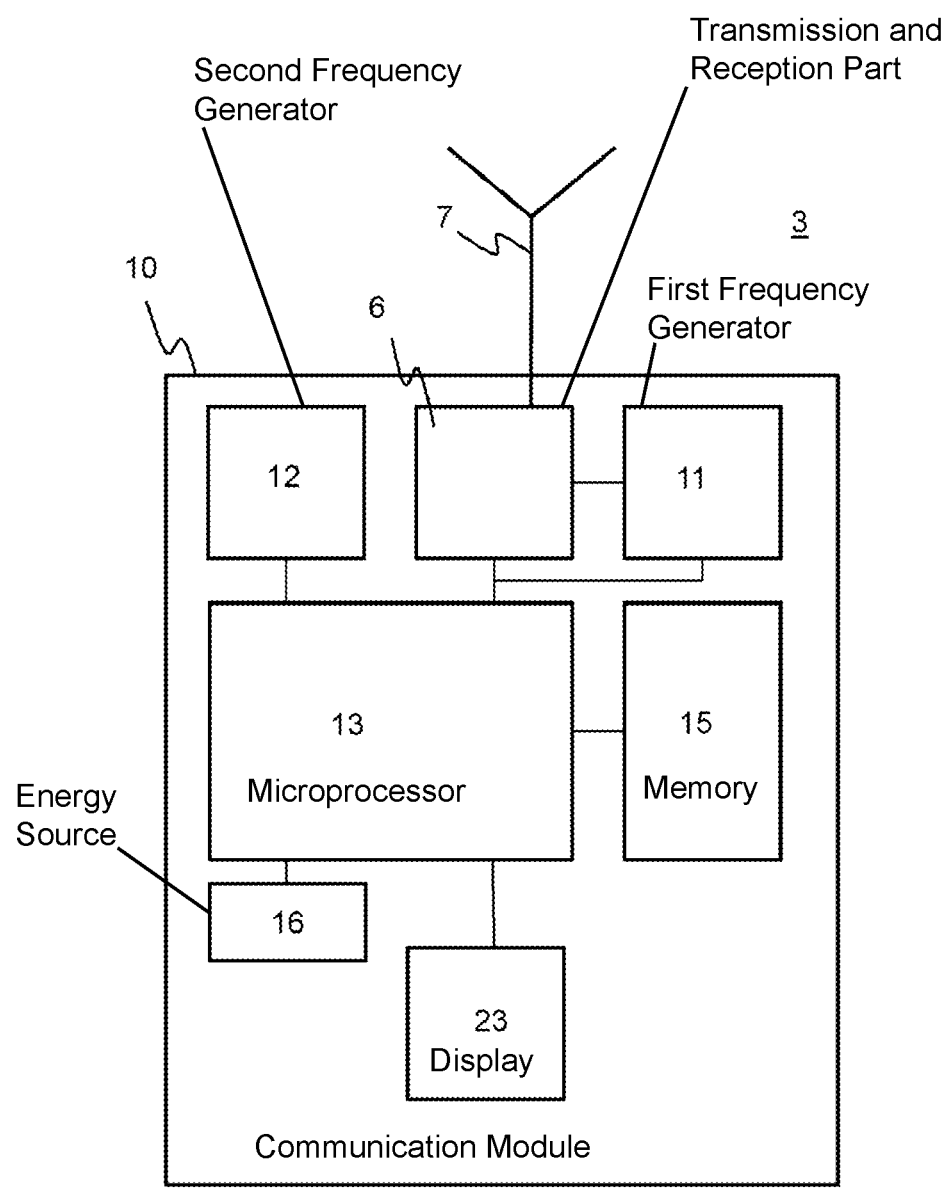
FIG. 2 is a highly simplified schematic and block diagram of an example of a base station for a communication network as shown in FIG. 1.

FIG. 2 shows a highly simplified schematic depiction of an illustrative configuration of a base station 3 of the communication system 1 shown in FIG. 1, which base station is operated on an energy-autonomous basis. The base station 3 includes a transmission and reception part 6 with an antenna 7, and a microprocessor 13 that has a memory 15 and controls the display 23.

In addition, the base station 3 has a first frequency generator 11 in the form of an HF (high-frequency) crystal and a second frequency generator 12 in the form of an LF (low-frequency) crystal. The second frequency generator 12 is used for time recording and, analogously to the second frequency generator 21 of the respective node 2, is therefore likewise always active. The second frequency generator 12 typically has a corresponding error in the order of magnitude of 100 ppm. The error of the first frequency generator 11 is in the region of 20 ppm.

By contrast, the first frequency generator 11, analogously to the first frequency generator 18 of the respective node 2, is likewise activated only at times at which the transmission and reception part 6 opens a reception window for receiving the data packets 40-1, 40-n of the respective nodes 2 or sends data packets 50-1, 50-n in the downlink.

An energy source 16 is preferably a battery, in particular a battery having a capacity of 80 Ah max. In order to achieve an autonomous operating period for several years with such an energy source, the base station 3 cannot be always activated. The base station 3, or the transmission and reception part 6 thereof, should be activated, that is to say form a reception window, only if the respective node 2 transmits data packets 40-1, 40-n to the base station 3 or the base station 3 sends data packets 50-1, 50-n in the downlink. In the remaining periods, the transmission and reception part 6 of the communication module 10 of the base station 3 should be in the sleep mode.

A time crystal that needs to be used for the respective second frequency generator 21, or 12, typically has, as explained above, an error in the order of magnitude of 100 ppm in each case. This corresponds to a timing error of 100 μs/s in each case. Without calibration, a total error of 200 ppm could occur in the worst case. The period of time between the last data packet of the data packets 40-1, 40-n in the uplink and the first data packet of the data packets 50-1, 50-n in the downlink is normally e.g. approximately 300 seconds. This would already produce an error of 30 ms in the case of the timing error of 100 μs/s. However, the receiver in the node 2 searches only over a short period, e.g. over a period of one quarter of the symbol duration. At a symbol rate of 2 kbaud, this would be 0.125 ms for the example indicated. Longer search times are not possible with conventional microcontrollers.

Figure 3A:
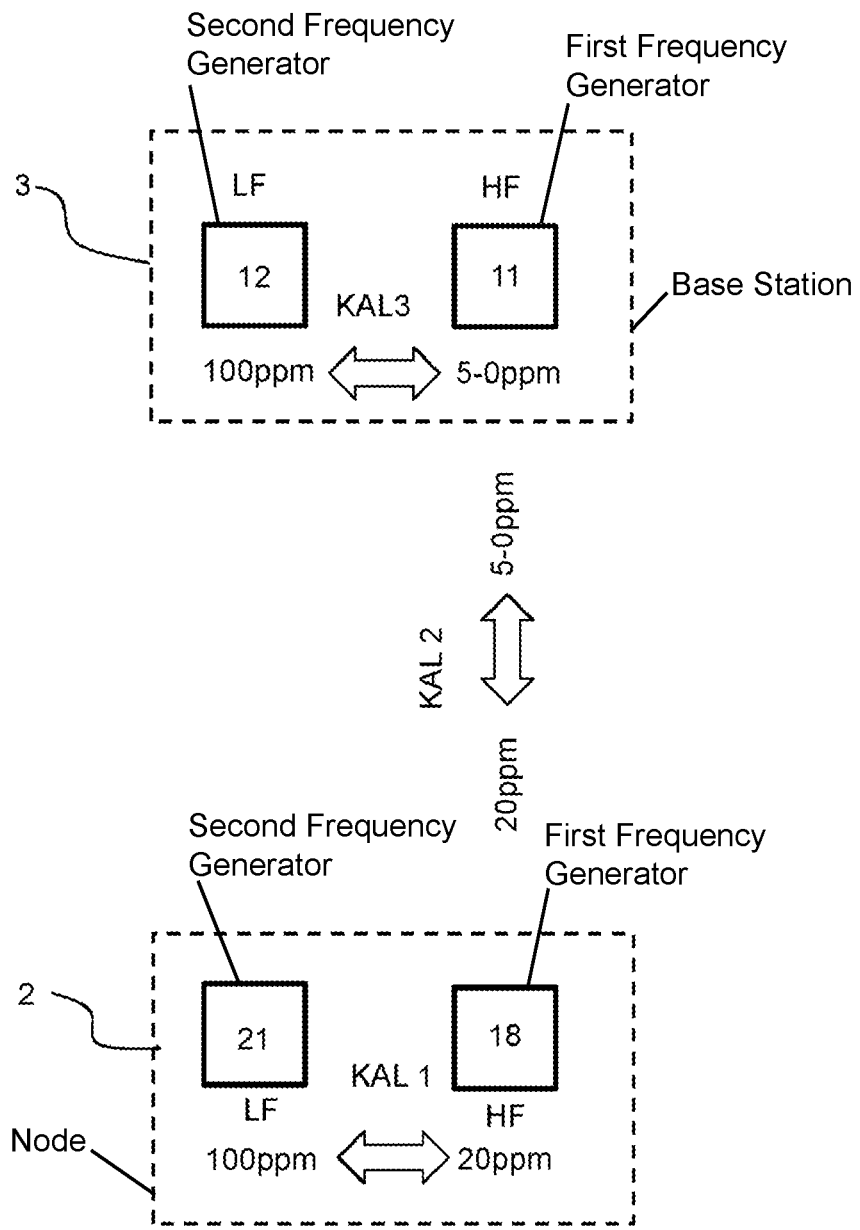
FIG. 3 is a highly simplified block diagram of various calibrations in the node and the base station, specifically when there are separate frequency generators in the base station (FIG. 3A) and when there is a single frequency generator for LF and HF in the base station (FIG. 3B)

FIG. 3A shows a calibration KAL1 in the region of the node 2, the calibration being able to be used to reduce the deviation in the node between the second frequency generator 21 and the first frequency generator 18 from approximately 100 ppm to 20 ppm using the approach described in German Patent DE 10 2005 020 349 B4. The error is then five times smaller than the error cited at the outset. Given 20 ppm and the aforementioned 300-second interval of time, the error in the node 2 would still be 6 ms, that is to say still far more than 0.125 ms.

Furthermore, when there are separate frequency generators 11 and 12 in the base station 3, it is also possible to perform a calibration KAL3 for the second frequency generator 12 of the base station 3 and the first frequency generator 11 of the base station 3.

Furthermore, when a data packet 40-1, 40-n from the respective node 2 is received, it is possible to perform a calibration KAL2 between the first frequency generator 11 of the base station 3 and the first frequency generator 18 of the respective node 2 and to store that calibration in the base station 3. This allows the error in the base station 3 of 20 ppm to be significantly reduced, namely theoretically to an error of 0 ppm. Since the calibration method has only a finite accuracy in the practical implementation (for example due to temperature variations and the like), however, a reduction to a range of 5-0 ppm should realistically be targeted.

The additional improvement in accuracy achieved thereby therefore once again corresponds to a factor of at least 4.

Figure 3B:
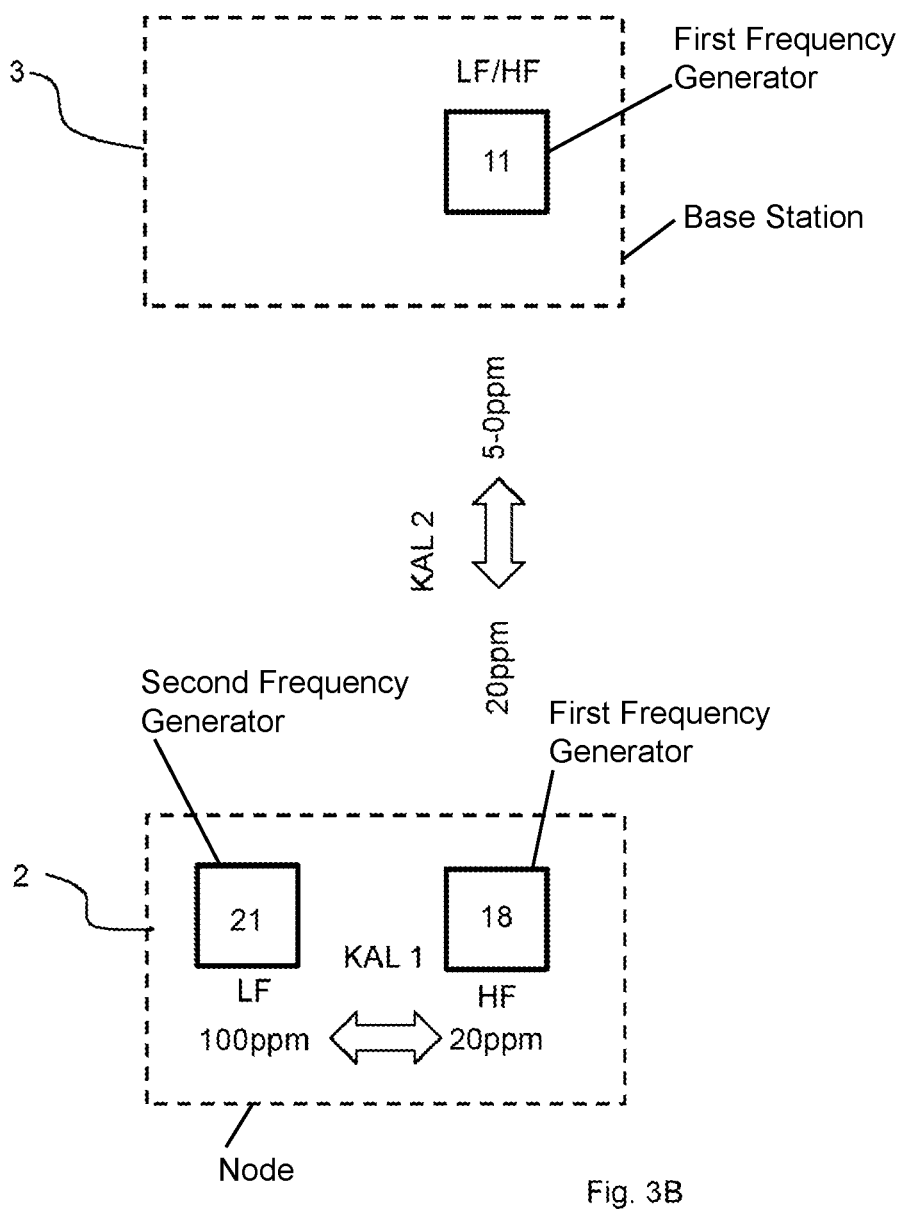

If, as FIG. 3B shows, there is provision for only a single frequency generator 11 (crystal) in the base station 3, which frequency generator determines both the frequency for the time recording and the carrier frequency, then a calibration KAL2 can be omitted without replacement.

Figure 4:
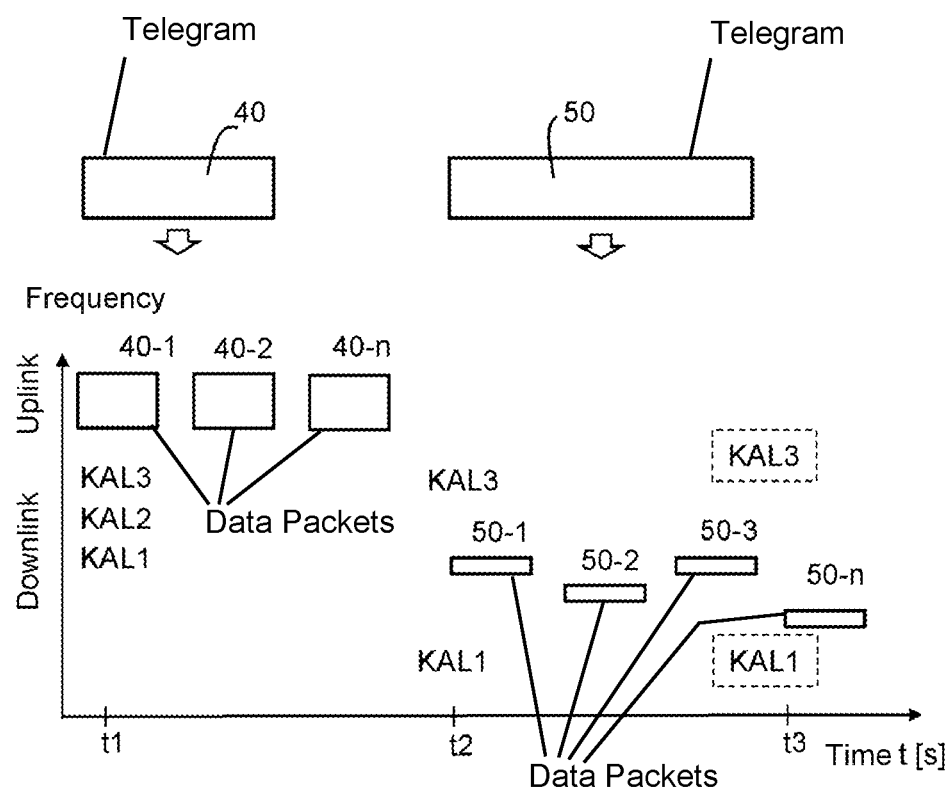
FIG. 4 is a highly simplified block diagram of the sending of uplink and subsequent downlink data packets and of calibrations performed during this period according to an illustrative embodiment of the invention.

FIG. 4 shows an example of a transmission of a telegram 40 from the node 2 to the base station 3 in the uplink and, subsequently, a transmission of a telegram 50 from the base station 3 to the node 2 in the downlink. In this case, the telegram 40 or 50 is not transmitted as such but rather is split into individual data packets 40-1 to 40-n, or 50-1 to 50-n, which are gradually successively transmitted from the node 2 to the base station 3 from the time t1 onward, or from the base station 3 to the respective node 2 from the time t2 onward. In the base station 3, or node 2, the data packets 40-1 to 40-n, or 50-1 to 50-n, are reassembled, or recombined, to obtain the information of the telegram 40 or 50.

In the example shown, a calibration KAL1 for the first frequency generator 18 and the second frequency generator 21 of the node 2 is performed at the time t1 immediately before or with the first data packet 40-1. This reduces the offset of the second frequency generator 21 to the offset of the first frequency generator 18. When the data packet 40-1 is transmitted, a calibration KAL2 between the first frequency generator 18 of the node 2 and the first frequency generator 11 of the base station 3 can also take place at the same time, with the result that the base station 3 knows, on the basis of the calibrations KAL1 and KAL2, when the first data packet 50-1 of the subsequent data packets 50-1 to 50-n of a subsequent telegram 50 is meant to be transmitted from the base station 3 to the node 2 at the time t2 in order to meet the reception window as exactly as possible. In addition to the calibrations KAL1 and/or KAL2, it is also possible, preferably at the same time as KAL1, for a calibration KAL3 for the second frequency generator 12 and the first frequency generator 11 of the base station 3, cf. FIG. 3, to take place, provided that the base station 3 has two separate frequency generators 11 and 12, as is shown in FIG. 3A. If, as shown in FIG. 3B, the frequency (LF) for the time and the frequency (HF) for the carrier frequency are generated by a single frequency generator 11, the calibration KAL3 is omitted.

Some time can elapse from the calibration KAL1 at the time t1 to reception of the first data packet 50-1 in the downlink at the time t2, as a result of which a time/temperature-related offset of the second frequency generator 21 of the respective node 2 can arise. Specifically, the second frequency generator 21 of the respective node 2 has an offset behavior that is highly temperature-dependent.

In order to avoid inaccuracies in the reception of the data packets 50-1 to 50-n, there is provision according to the invention for at least two calibrations KAL1 to be meant to take place in the period of the succession of the transmission of a telegram 40 in the uplink and an immediately subsequent telegram 50 in the downlink. There is provision for a further calibration KAL1 at the time t2 in the example in FIG. 4. As a result, the second frequency generator 21 of the node 2 is recalibrated prior to reception of the first data packet 50-1, which allows a time- and/or temperature-related offset since the calibration KAL1 at t1 to be eliminated. The result of this is that the reception windows for receiving the data packets 50-1 to 50-n can be set more exactly by the respective node 2. In addition, the search, i.e. the temporal search range in the reception window, can also be readjusted on the basis of the second calibration KAL1. Moreover, the interval between the uplink data packets 40-1, 40-n and downlink data packets 50-1, 50-n can be increased.

In the configuration of the method according to the invention that is shown in FIG. 4, the calibration KAL1 is situated between the last data packet 40-n of the uplink telegram 40 and the first data packet 50-1 of the downlink telegram 50.

If required, a further calibration for the second frequency generator 21 and the first frequency generator 18 of the respective node 2 can take place during the transmission period for the individual data packets 50-1 to 50-n, for example at the time t3. This allows a time/temperature-related offset reappearing since the calibration KAL1 at the time t2 to be eliminated again. When there are multiple calibrations KAL1 successively taking place during the transmission period for the individual data packets 50-1 to 50-n, the most current calibration KAL1 in each case is used to determine when the reception window for the individual data packets 50-1 to 50-n is meant to be opened and/or how the search range is meant to be stipulated.

The individual data packets 50-1 to 50-n are transmitted at different frequencies, as can be seen from FIG. 4. Alternatively, the data packets of the 50-1 to 50-n can also be transmitted at one and the same frequency. In both cases, a time- or temperature-related offset causes the arrangement of the individual data packets 50-1 to 50-n to be shifted as a whole.

According to a further exemplary embodiment of the present invention, a compensation factor KF can be determined from the offset produced over time from at least two calibrations KAL1, e.g. the calibration KAL1 at t2 and at t3. This compensation factor KF can be used to provide information during the reception algorithm for searching for the data packets 50-1 to 50-n within a reception window, or to optimize the reception algorithm.

In the time interval between t1 and t2, or t2 and t3, the offset of the second frequency generator 21 of the node rises continuously. By way of example, the offset can already be 3 ppm at the time t2. Without calibration, the offset would already be 9 ppm, for example, at the time t3. Using the compensation factor KF, it is now possible to stipulate the timing of reception of the stored data over time more exactly by including the ascertained offset. This firstly saves processing power, and secondly actually allows reception for the first time in some situations.

Figure 5:
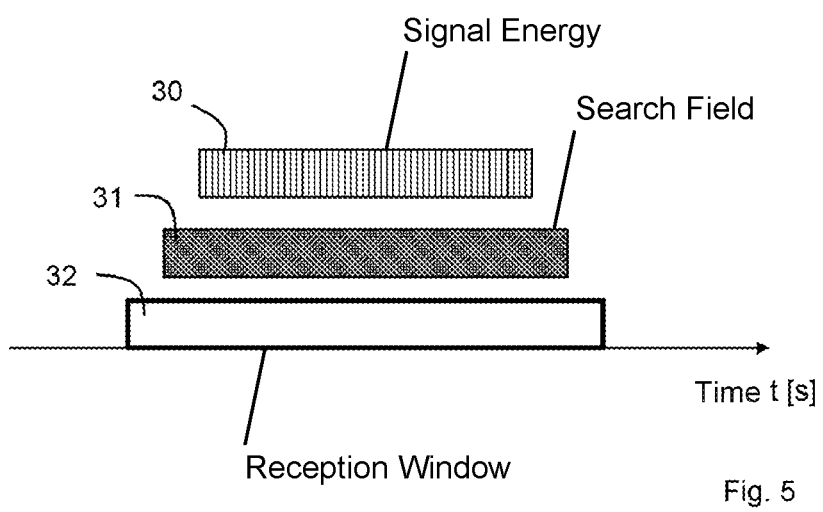
FIG. 5 is a highly simplified diagram depicting a reception window of the node, of the related search field of a reception algorithm of the node and of the incoming signal energy, each depicted over the time axis.

FIG. 5 shows a reception window 32 of the node 2, that is to say the time window for which the communication module 17 of the node 2 is open to receive a telegram 50 from the base station 3. On the other hand, reference numeral 30 denotes the timespan of the signal energy, that is to say the electromagnetic energy received by the antenna 8 of the node 2. By contrast, the search field 31 embodies the temporal search field of the reception algorithm of the node 2, or of the communication module 17 thereof, for the incoming signals. Ideally, the reception window 32, the search field 31 and the signal energy 30 are in a symmetrical arrangement in relation to one another. The reception window 32 and the search field 31 are always situated symmetrically and move for an offset of the second frequency generator 21 of the node 2 together with the signal energy 30.

Figure 6:
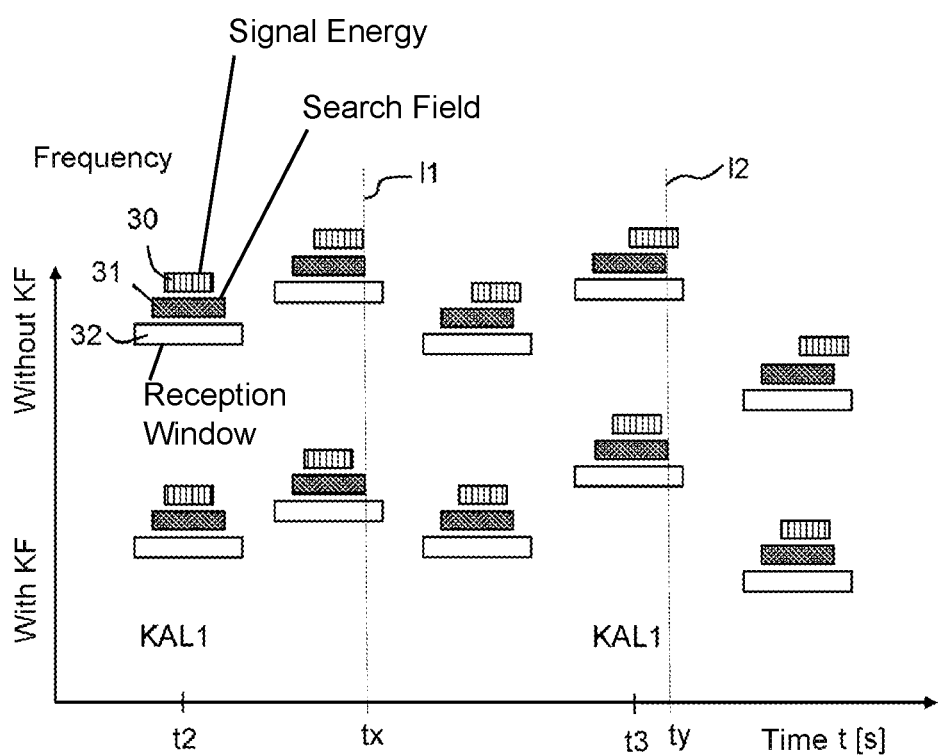
FIG. 6 is a highly simplified diagram depicting multiple reception windows of a node, of the respective related search field of the reception algorithm of the relevant node and of the respective related signal energy over the time axis on reception of downlink data packets by the node and of calibrations performed in the node during this period according to an illustrative embodiment of the invention.

As can be seen from FIG. 6, the arrangement of the respective reception window 32 and the search field 31 is always fixed in place in relation to one another in the same way, since both ranges are determined by the second frequency generator 21 of the node in the same way. The offset occurring from the time t2 onward means that the position of the reception window 32 and of the search field 31 of the respective data packet moves increasingly compared to the trend in the signal energy 30, as demonstrated in FIG. 6 using the lines l1 and l2 in the range without a compensation factor ("without KF").

If, by contrast, the compensation factor KF is included in the reception algorithm as well, then the node expects the data packets 50-1 to 50-$n$ at an earlier or later time, according to the compensation factor KF. A prerequisite in this case is that both sides of the reception window 32 include a certain tolerance range.

If for example the offset during the calibration KAL1 is 10 ppm at the time t2, then it is 20 ppm at the time t3. On the basis of the communication factor KF, the node 2 therefore assumes that the clocks of the second frequency generator 21 and the first frequency generator 18 diverge by 10 ppm, and therefore expects the relevant data packets from the stored data somewhat later. This firstly saves computation time and secondly makes reception possible only when high deviations already exist.

If for example an offset of e.g. 10 ppm is measured at t2 during the KAL1 and an offset of e.g. 20 ppm is measured in a further measurement at the time t3, then the control and computing unit 19 of the node 2 computes a response that reproduces the compensation factor KF over time, i.e. the time delay compared to an ideal signal. The data packet at t3 would therefore need to be compensated for by 20 ppm. Assuming that 20 seconds have elapsed from t2 to the data packet at t3, the error between t2 and t3 would be 20 s×10 ppm=200 μs. On the illustrative assumption that the digital IQ data are stored at a sampling rate of 50 ksamp/s, a sample has a corresponding time of 20 μs. The control and computing unit 19 can therefore skip 10 samples, for example, in order to search, or scan, at the correct location. The compensation factor KF therefore allows fine adjustment of the search field 31 of the signal sample in regard to the time axis t.

Figure 7:
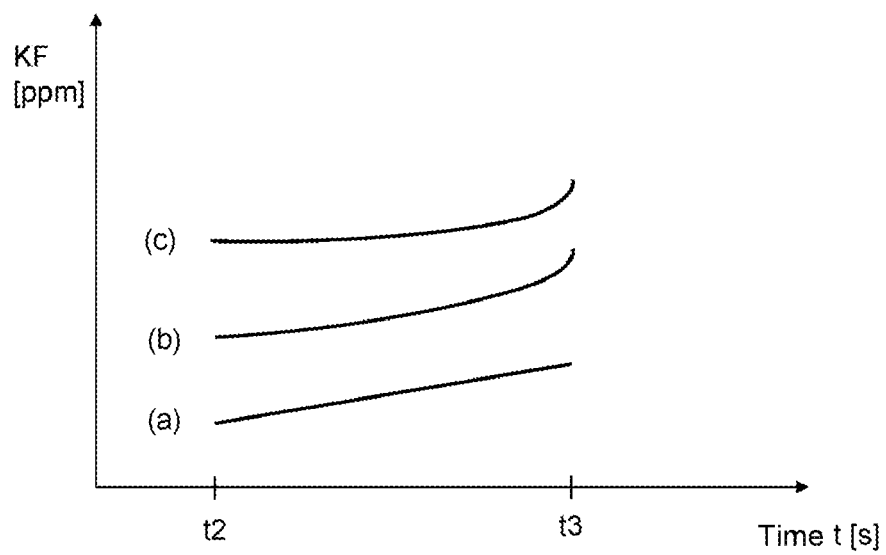
FIG. 7 is a highly simplified diagram depicting different responses of the compensation factor over time tin a time interval from t2 to t3.

FIG. 7 shows various responses for the compensation factor KF over time. In the case of curve (a), a calibration KAL1 has taken place at the time t2. The second frequency generator 21 and the first frequency generator 18 of the node diverge by 2 ppm, for example. Assuming that 10 seconds have elapsed from t2 to t3, this produces an offset of 20 μs (2 ppm×10 s). The gradient of the curve is therefore linear.

In the case of curve (b), a deviation of 2 ppm was measured at the time t2, for example, and a deviation of 6 ppm was measured at the time t3. The curve shows a rising compensation factor, but quadratically rather than linearly. In order to compute the compensation factor, it is therefore necessary to take into consideration an appropriate quadratic function.

In the case of curve (c), the influence of the temperature on the offset is shown, which means that this response also has a shape that is not linear but rather based on a quadratic factor.

When computing the compensation factor KF, it is moreover also possible to include specific offset/temperature characteristic curves for the second frequency generator and in particular also for the second frequency generator 21 of the node and in particular also for the first frequency generator 18 of the node 2.

Alternatively or additionally, it is also possible to extrapolate a curve shape in order to allow stipulations for the future for the node 2.

The following is a summary list of reference numerals and the corresponding structure used in the above description of the invention:

1 communication system
2 node
3 base station
4 charging unit (node)
5 energy buffer (node)
6 transmission and reception part
7 antenna
8 antenna
9 display
10 communication module (base station)
11 first frequency generator (base station)
12 second frequency generator (base station)
13 microprocessor (base station)
14 reception window
15 memory
16 battery
17 communication module (node)
18 first frequency generator (node)
19 control and computing unit (node)
20 second frequency generator (node)
21 battery
22 display
23 signal
30 search field (reception algorithm)
31 reception window
32 telegram uplink
40-1 to 40-$n$ data packet uplink
50 telegram downlink
50-1 to 50-$n$ data packet downlink
KAL1 calibration LF/HF in the node
KAL2 calibration HF node/HF base station
KAL3 calibration LF/HF base station

The invention claimed is:

1. A method for transmitting data by radio between at least one battery-operated node and a base station in a communication system using bidirectional radio transmission operation, the method comprising:

providing the base station with a communication module having a first frequency generator;

providing the node with a communication module having a first frequency generator and a second frequency generator with a lower frequency than a frequency of the first frequency generator;

using the communication module of the node to transmit the data to the communication module of the base station in an uplink by splitting a radio telegram into at least two or a multiplicity of uplink data packets transmitted successively at intervals of time;

using the communication module of the base station to transmit the data to the communication module of the node in a downlink by splitting a radio telegram into at least two or a plurality of downlink data packets transmitted successively at intervals of time; and performing at least two calibrations for the first frequency generator and the second frequency generator of the node during a transmission period for a sum total of a succession of the uplink data packets and a subsequent succession of the downlink data packets including any period coming in between.

2. The method according to claim 1, which further comprises performing a calibration between reception of a last uplink data packet and reception of a first downlink data packet of subsequent downlink data packets in the node.

3. The method according to claim 1, which further comprises performing at least one calibration over a total duration of the transmission of the downlink data packets after reception of a first downlink data packet.

4. The method according to claim 1, which further comprises performing a calibration continually over successions of the uplink data packets and the downlink data packets.

5. The method according to claim 1, which further comprises constantly activating the second frequency generator during operation of the node, and only intermittently activating the first frequency generator.

6. The method according to claim 1, which further comprises determining a resultant offset from the at least two calibrations at different times, deriving a compensation factor from the offset and including the compensation factor in a reception algorithm for searching for the downlink data packets within a reception window.

7. The method according to claim 6, which further comprises performing one calibration of the at least two calibrations during the transmission period for the sum total of the succession of the downlink data packets.

8. The method according to claim 6, which further comprises performing one calibration of the at least two calibrations at a beginning of the transmission period for the sum total of the succession of the downlink data packets.

9. The method according to claim 7, which further comprises computing a response of the offset over a time interval to determine the compensation factor.

10. The method according to claim 8, which further comprises computing a response of the offset over a time interval to determine the compensation factor.

11. The method according to claim 6, which further comprises moving a search field of the reception algorithm in relation to the reception window based on the compensation factor.

12. The method according to claim 6, which further comprises taking the compensation factor as a basis for selecting specific samples stored in the communication module from a total quantity of samples stored in the communication module.

13. The method according to claim 6, which further comprises including specific offset/temperature characteristic curves of the second frequency generator when determining the compensation factor.

14. The method according to claim 6, which further comprises including specific offset/temperature characteristic curves of the first frequency generator when determining the compensation factor.

15. The method according to claim 1, which further comprises providing the base station with a second frequency generator, and performing the at least two calibrations for the first frequency generator and the second frequency generator of the node while carrying out a calibration for the second frequency generator of the base station and the first frequency generator of the base station.

16. The method according to claim 1, which further comprises determining a transmission time of at least one uplink data packet by considering a first calibration of the at least two calibrations.

17. The method according to claim 16, which further comprises taking a second or subsequent calibration of the at least two calibrations as a basis for determining at least one of a reception window for at least one downlink data packet or a search range for at least one downlink data packet.

18. The method according to claim 1, which further comprises installing the at least one battery-operated node permanently at a fixed location.

19. A radio-capable node for transmitting data or sensor data by radio to a base station over a bidirectional radio transmission link, the radio-capable node comprising:
   a control and computing unit;
   a battery;
   a communication module;
   a first frequency generator; and
   a second frequency generator;
   said control and computing unit being at least one of configured or programmed to operate the node according to the method of claim 1.

20. The method according to claim 1, wherein the data are sensor data.

* * * * *